United States Patent
Bircann et al.

(10) Patent No.: US 6,538,543 B2
(45) Date of Patent: Mar. 25, 2003

(54) PARTICLE-IMPEDING AND VENTILATED SOLENOID ACTUATOR

(75) Inventors: Raul A. Bircann, Penfield, NY (US); Dwight O. Palmer, Rochester, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/777,322

(22) Filed: Feb. 6, 2001

(65) Prior Publication Data

US 2001/0033214 A1 Oct. 25, 2001

Related U.S. Application Data

(60) Provisional application No. 60/184,571, filed on Feb. 24, 2000.

(51) Int. Cl.⁷ .................................. H01F 7/08
(52) U.S. Cl. ...................... 335/220; 251/129.15
(58) Field of Search .................. 335/256, 266–269, 335/220–229, 276–278, 279; 251/129.15–129.21

(56) References Cited

U.S. PATENT DOCUMENTS 6,062,536 A  *  5/2000  Bircann .................. 251/129.15
6,397,891 B1 *  6/2002  Neuhaus et al. ....... 137/625.65

* cited by examiner

*Primary Examiner*—Lincoln Donovan
(74) *Attorney, Agent, or Firm*—Patrick M. Griffin

(57) ABSTRACT

An improved solenoid for providing linear actuation. The outer polepiece of the solenoid is provided with a plurality of radially-dispersed labyrinthine passageways in communication between the exterior of the solenoid and an interior region including the armature and the interior of the windings. The polepiece is further provided with at least one passageway in communication between the exterior of the solenoid and an outer periphery of the windings within the housing. The two sets of passageways impede particles and droplets of moisture from entering the solenoid, while simultaneously permitting moisture such as condensation within the solenoid to evaporate and escape.

7 Claims, 3 Drawing Sheets

PARTICLE-IMPEDING AND VENTILATED SOLENOID ACTUATOR

CROSS-REFERENCE TO RELATED APPLICATIONS

This application claims the benefit of U.S. Provisional Application, Ser. No. 60/184,571, filed Feb. 24, 2000.

TECHNICAL FIELD

The present invention relates to electric solenoids as used in mechanical linear actuators; more particularly, to such solenoids as may be required to operate in moist conditions or over a wide range of temperatures; most particularly to such a solenoid having vents which impede the entrance of particles of dirt, including droplets of liquids, into the interior, while simultaneously permitting the draining and evaporation of condensation.

BACKGROUND OF THE INVENTION

Electric solenoids are well known in electrical engineering and are widely used as actuating components in electromechanical linear actuators. A typical electric solenoid consists of a plurality of windings of an electric conductor about north and south polepieces. When current is passed through the windings, a characteristic toroidal magnetic field is produced having field lines at the axis which are parallel to the axis. A ferromagnetic armature is slidably disposed in an axial bore in the polepieces. An axial force is exerted by the magnetic field on the armature which tends to displace the armature axially. The strength of such force can be varied by varying the current flowing through the windings. Thus, by attaching the armature to a shaft, a solenoid may be adapted readily to provide linear mechanical actuation of a device to which it is attached. Solenoids are probably the commonest type of such actuators in use today.

Solenoids rely for efficiency on having very close tolerances among the various mechanical and electrical components, and they are therefore susceptible to failure if foreign particles, corrosive gases, corrosive solutions, or moisture are allowed to enter and remain within the solenoid housing. Some known solenoids are provided with housings which are hermetically sealed in an effort to prevent any contamination from ever entering. However, a sealed housing presents a dilemma. To the extent that such a housing succeeds in keeping contamination out, it also traps within itself any contaminant that is able to enter despite the housing design. Thus, contaminants, and especially water, may become trapped within a solenoid and may either short out electrically or corrode electrical and mechanical elements critical to the operation of the solenoid.

What is needed is an improved solenoid wherein particulates and droplets of moisture are impeded from entering directly, but wherein the interior of the solenoid is vented to the exterior to permit drainage and evaporation of moisture from within the solenoid.

SUMMARY OF THE INVENTION

The present invention is directed to an improved solenoid for providing linear actuation. The outer polepiece of the solenoid is provided with a plurality of radially-dispersed labyrinthine passageways in communication between the exterior of the solenoid and the interior region comprising the armature and the interior of the windings. The polepiece is further provided with at least one passageway in communication between the exterior of the solenoid and the outer periphery of the windings within the housing. The two sets of passageways impede particles and droplets of moisture from entering the solenoid, while simultaneously permitting moisture such as condensation within the solenoid to drain or to evaporate and escape.

BRIEF DESCRIPTION OF THE DRAWINGS

The foregoing and other objects, features, and advantages of the invention, as well as presently preferred embodiments thereof, will become more apparent from a reading of the following description in connection with the accompanying drawings, in which.

DESCRIPTION OF THE PREFERRED EMBODIMENT

Figure 1:
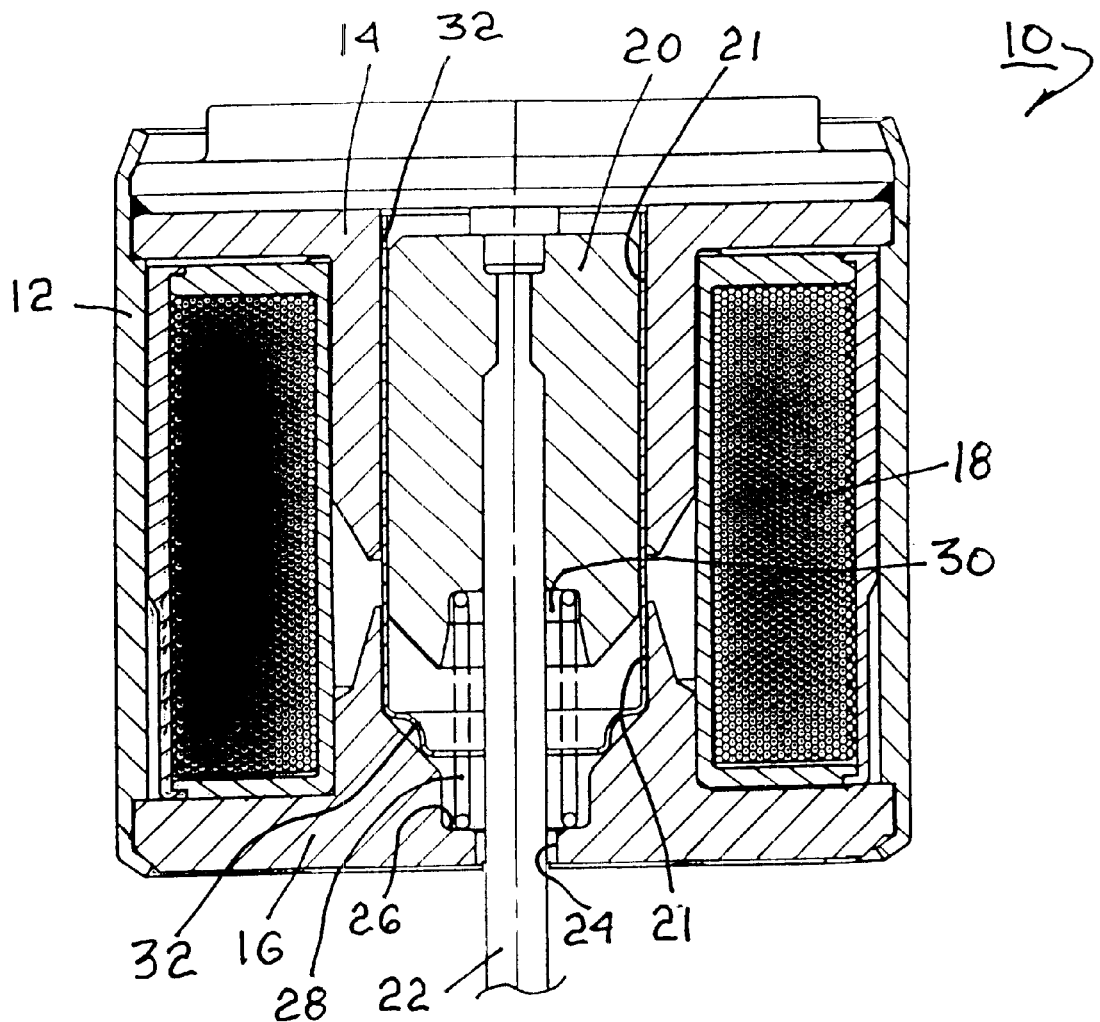
FIG. 1 is an elevational cross-sectional view of a prior art solenoid actuator.

The benefits afforded by the present invention will become more readily apparent by first considering a prior art solenoid actuator. Referring to FIG. 1, a prior art actuator 10 includes a housing 12 containing first and second pole pieces 14,16, respectively, and a plurality of electrically-conductive windings 18 about the polepieces. A ferromagnetic armature 20 is slidably disposed within a stepped first axial bore 21 in the pole pieces. An actuating shaft 22 is axially disposed and retained within armature 20 and extends from housing 12 via a second axial bore 24 in polepiece 16 for connection to useful work. Step 26 in bore 21 receives a coil spring 28 disposed in compression between step 26 and a well 30 in armature 20 for biasing the armature into the solenoid. A generally cylindrical non-magnetic sleeve 32 surrounds armature 20 and spring 28 for slidably guiding and centering the armature axially of polepieces 14 and 16. Typically, the sleeve is formed of a non-galling non-ferromagnetic material such as stainless steel or ceramic, and either the sleeve or the armature may be coated with any of various well-known dry lubricants. Typically, the armature is hard-nickel coated.

Figure 2:
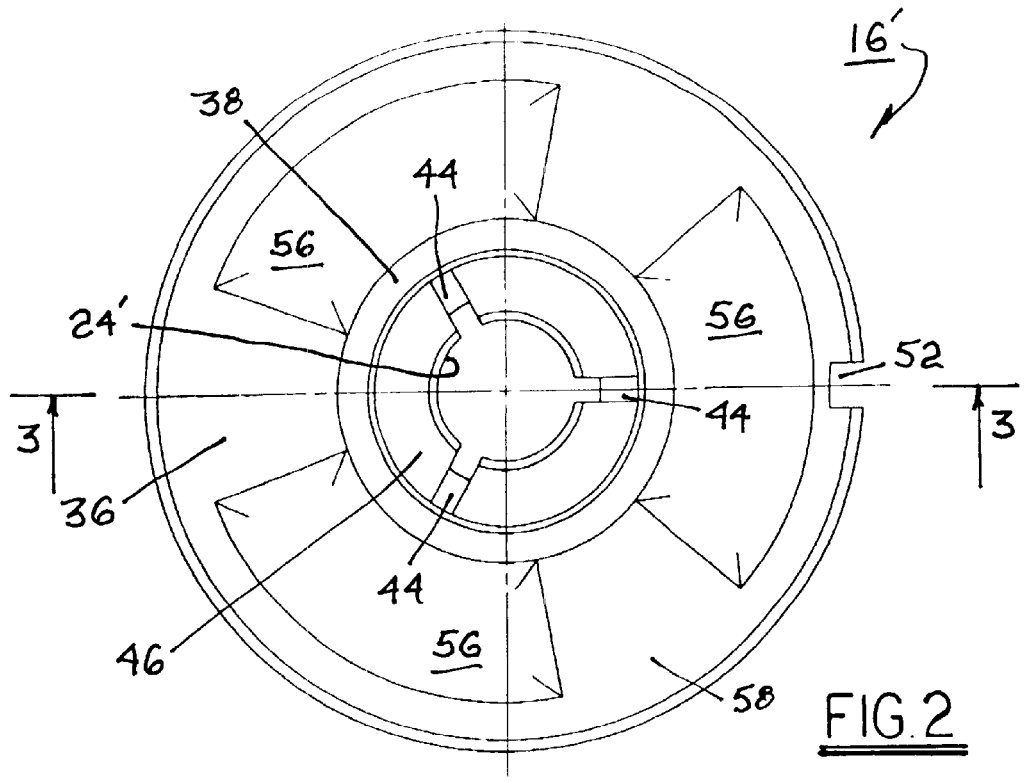
FIG. 2 is a plan view of an improved outer polepiece for a solenoid actuator in accordance with the invention.
Figure 3:
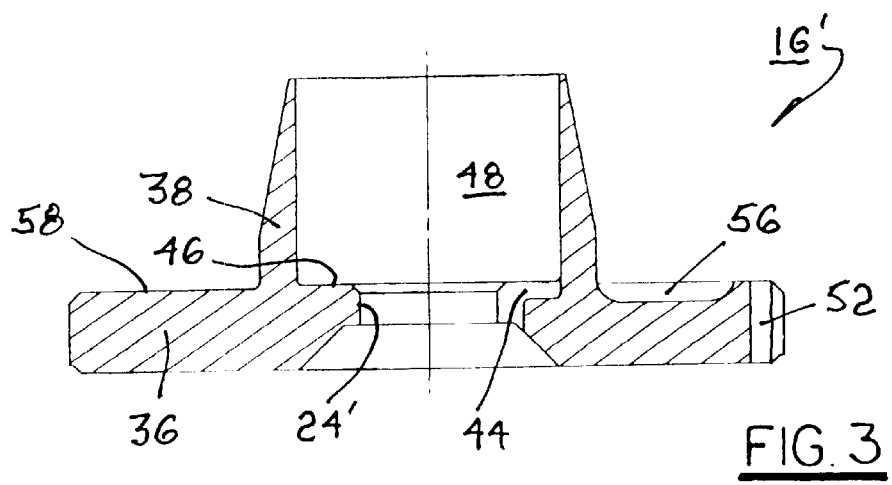
FIG. 3 is an elevational cross-sectional view of the polepiece shown in FIG. 2, taken along line 3—3 therein.
Figure 4:
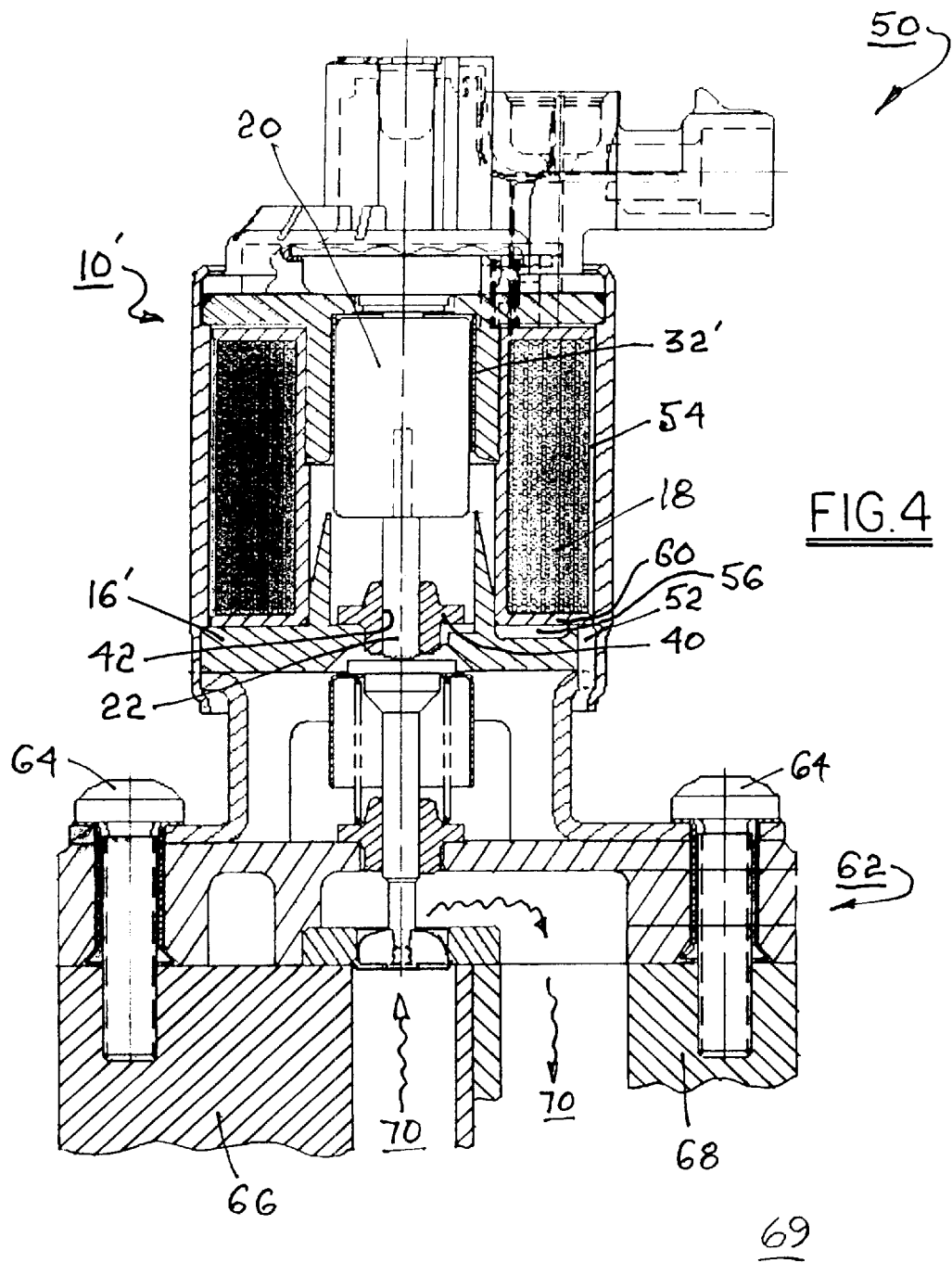
FIG. 4 is an elevational cross-sectional view of a solenoid actuator in accordance with the invention operationally attached to an exhaust gas recirculation (EGR) valve mounted on an internal combustion engine.

Referring to FIGS. 2 through 4, improved outer polepiece 16' is similar in shape, and preferably is substitutable for, prior art polepiece 16, having both a radial portion 36 and a tapered axial portion 38. However, polepiece 16' is provided with three important and novel features not present in polepiece 16.

First, axial bore 24 is replaced by a new axial bore 24' for receiving a new steady bearing 40 not found in prior art solenoid 10. Bearing 40 has an axial bore 42 for receiving shaft 22 and for supporting and radially guiding the shaft during reciprocating actuation of the solenoid. Preferably, the diametral relationship between bore 42 and shaft 22 is as close as is practical without introducing significant drag on shaft 22 during actuation thereof. The presence of close-tolerance guidance of the shaft through the bearing permits a significant reduction in the size and axial extent of sleeve 32 which is replaced by a half-sleeve 32' as shown in FIG. 4. Preferably, bearing 40 is press-fit into bore 24'.

Second, at least one radial passageway 44 is provided in the floor 46 of well 48 formed within axial portion 38, preferably a plurality of such passageways, for example, three radially disposed at 120° as shown in FIG. 2. Passageways 44 extend from floor 46 through polepiece 16' to the exterior of the solenoid. The elimination of prior art axial bore 24, which is loose-fitting of shaft 22, and its replacement by bore 24' containing press-fit bearing 40 and close-tolerance bore 42 create a drainage problem within well 48, in that condensation forming within the central region of the solenoid will be trapped, which is highly undesirable and can lead to mechanical and/or electrical failure of the solenoid. Thus, central region passageways 44 provide ready drainage of well 48. Provision of drainage passageways 44 represents a recognition that an actuator having a reciprocable shaft extending therefrom cannot be, as a practical matter, hermetically sealed against entrance of moisture, especially when the actuator may be called upon to function over a very large range of temperatures and ambient humidities, for example, in an EGR valve assembly such as assembly 50 shown in FIG. 4. Therefore, it is preferable to accept the fact that internal condensation will occur, to configure the solenoid as open to the atmosphere, and to provide for ventilation and drainage from the solenoid. Note that passageways 44 are preferably labyrinthine, having two offset 90° bends after installation of bearing 40, to impede ingress of particulates and moisture droplets by direct impingement, without also impeding drainage and ventilation.

Third, at least one peripheral drainage and ventilation passageway 52 is provided through polepiece 16' for draining condensation from regions of the solenoid outside of well 48. Preferably, the windings and/or housing of a solenoid incorporating polepiece 16' also are modified to provide an annular gap 54 between the outer surface of the windings and the inner surface of the housing 12, as shown in FIG. 4. Gap 54 provides air circulation around the windings via passageway 52 for cooling of the windings, evaporation of local condensation, and collection of non-evaporated condensation for drainage through one or more peripheral passageways 52.

In the preferred embodiment, polepiece 16' is further provided with one or more depressions 56 in upper surface 58 of radial portion 36, preferably three such areas radially disposed 120° apart, as shown in FIG. 2. Preferably, each depression includes a large central angle of about, for example, 90°, thereby leaving a relatively small percentage of surface 58 for contacting and supporting windings spool 60. Many actuators, including those used in EGR valve assemblies, must operate at significantly elevated ambient temperatures which can increase the resistance in windings 18 and proportionately reduce the strength of the solenoid. Depressions 56 and gap 54 serve to partially insulate the windings from heat rising from the valve 62 itself, thereby lowering the operating temperature of the solenoid with respect to the valve.

EGR valve assembly 50 comprises an improved solenoid actuator 10' including an improved outer polepiece 16' and the concomitant features, bearing 40, passageways 44 and 52, and depressions 56, all as just described. In use, such an assembly may be connected as by bolts 64 to the exhaust manifold 66 and the intake manifold 68 of an internal combustion engine 69 for metering the flow of exhaust gas 70 therebetween.

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiments may be modified in light of the above teachings. The embodiments described are chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A solenoid for providing linear actuation, comprising:
   a) first and second polepieces having first and second respective axial bores coaxially disposed along a common axis;
   b) an electrical conductor wound around said polepieces in a plurality of turns;
   c) an armature slidably disposed in said axial bores in said polepieces;
   d) a rigid bearing axially disposed in one of said polepieces; and
   e) a shaft attached coaxially to said armature and extending through a supportive bore in said bearing, said shaft being axially displaceable by electromagnetic displacement of said armature to provide said actuation,
   wherein said rigid bearing-containing polepiece is provided with ventilative means for permitting the draining and evaporation of fluid from within said solenoid.

2. A solenoid in accordance with claim 1 wherein said ventilative means comprises at least one passageway extending between an interior central region and the exterior of said solenoid.

3. A solenoid in accordance with claim 2 wherein said at least one passageway is labyrinthine.

4. A solenoid in accordance with claim 1 wherein said ventilative means comprises at least one passageway extending between an interior peripheral region and the exterior of said solenoid.

5. A solenoid in accordance with claim 1 wherein said ventilative means comprises at least one passageway extending between an interior central region and the exterior of said solenoid and at least one passageway extending between an interior peripheral region and the exterior of said solenoid.

6. A solenoid in accordance with claim 5 further comprising a housing surrounding said electrical conductor, an annular space being provided between said housing and said electrical conductor.

7. A solenoid in accordance with claim 1 wherein said bearing-containing polepiece further comprises at least one depression on an axial surface thereof for thermally insulating said polepiece from said electrical conductor.

* * * * *